Figure 1:
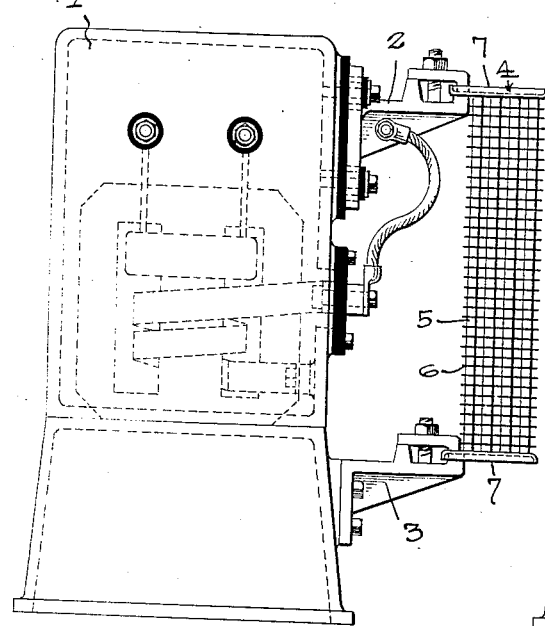

March 22, 1932.                    C. W. OWSTON                    1,850,473
                        METHOD OF SOLDERING FINS TO TUBES
                              Filed March 3, 1928

Inventor
Chas. W. Owston,
By Eugene Ewan
Attorney

Patented Mar. 22, 1932

1,850,473

UNITED STATES PATENT OFFICE

CHARLES WILLIAM OWSTON, OF DETROIT, MICHIGAN, ASSIGNOR TO McCORD RADIATOR & MFG. CO., OF DETROIT, MICHIGAN, A CORPORATION OF MAINE

METHOD OF SOLDERING FINS TO TUBES

Application filed March 3, 1928. Serial No. 258,899.

This invention relates to a method for electrically soldering the fins to the tubes of radiator cores, such as are used for automotive and other purposes.

The method heretofore most generally employed for soldering the fins to the tubes has been to first coat the tubes with solder before the fins are placed on the tubes and then place the entire assembly in a heated oven to bake the core to solder the fins to the tubes. This method requires the installation and maintenance of a specially constructed bake oven and burners which require care and attention to keep the heat in the oven at the desired temperature to solder the fins to the tubes. This method subjects the whole mass of the core (fin and tubes) to the heat required to fuse the solder, resulting in softening the fin plates and removing the temper therefrom. This renders the fin plates very soft and makes them easily crush and bend in handling or on contact with exterior objects in the manufacture of the complete radiator. To overcome this objection, it has been the practice in connection with the oven method of soldering fins to tubes to use a copper stock for the fin plates of a character which has a higher annealing heat than that required to fuse the solder. This stock is known as Lake copper, and is much more expensive than electrolytic copper, due to the lack of impurities, such as silver, which is carried by the high priced Lake copper. If it were not for the loss of temper, the fins of the core could be made from the cheaper material and be just as effective as the higher grade material used when the core is subjected to the baking process.

In accordance with my invention, the bake oven and its appurtenances with its care and attention are eliminated, and also the fins do not lose their temper, thereby permitting the cheaper electrolytic copper to be used in the manufacture of the core. I accomplish this by soldering the fins to the previously coated tubes by sending a suitable electric current, such as one of high amperage and low voltage, through the tubes, after the fins have been applied, to heat the tubes to the fusing point of the solder coatings on the tubes. The fins are thus heated for only a short area directly about the openings therein through which the tubes pass. The remaining portions of the fins act as radiating surfaces to keep the fins cool, and result in maintaining temperatures which will not draw the temper from the fins. Consequently, the fins are not softened, as by the oven method and the fins therefore retain their property to resist bending and distortion in handling the core in the manufacture of the radiator.

In accordance with my invention, I employ a step-down transformer for supplying the electric current to the tubes of the core. The terminals of the transformer are clamped to the headsheets of the core, to which sheets the tubes of the core are connected as in radiator design. The terminals are connected to these head sheets in that they provide a convenient way in which to furnish the current to the multiplicity of tubes in the core. In applying the current to the headsheets, perfectly soldered connections are secured between the headsheets and the ends of the tubes, which is not the case in the baking method. In the baking method, the headsheets are usually discolored by the heat from the gas burners, such gas heat tending to oxidize the brass in the headsheet, which oxide is hard to remove with the ordinary acids employed in soldering operations. With the electrically applied heat this condition does not exist, and the headsheets and tubes are soldered together and require no additional treatment to overcome any defects after the fins and the tubes have been subjected to the electric current in accordance with my invention.

In the accompanying drawings, I have shown an apparatus for accomplishing this result.

Figure 2:
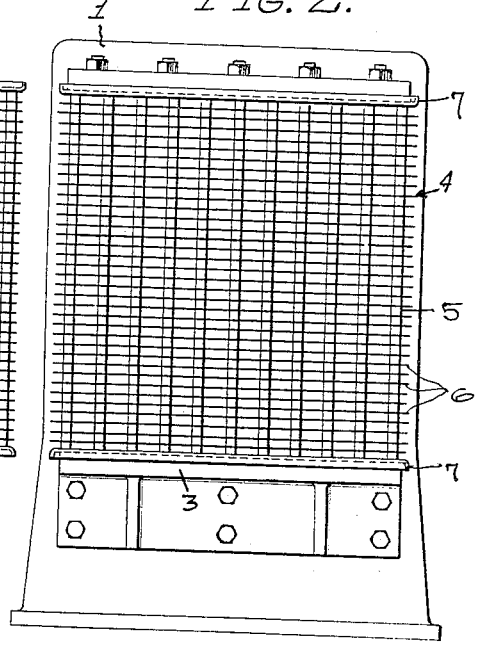
Figure 3:
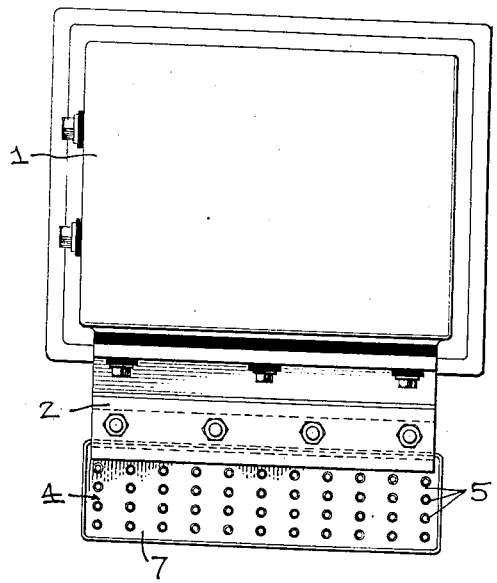
Figure 4:
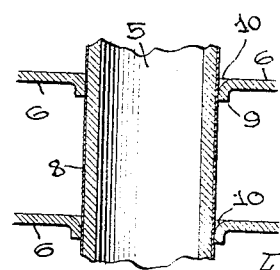
Figure 5:
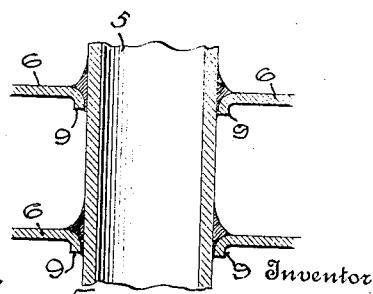

Figs. 1, 2, and 3 are side, front, and top plan views, respectively, of a conventional step-down transformer showing a core to be soldered applied thereto in accordance with my invention;

Fig. 4 is a vertical sectional view through a coated tube with fins thereon before heating the tube; and Fig. 5 is a similar view of the same parts after the fins have been soldered to the tube.

In the drawings, 1 indicates a conventional form of step-down transformer having on the outside therof vertically spaced positive and negative, terminal clamps 2, 3, on the live and ground sides, respectively, of the device. The clamp 2 is adjustably mounted in a vertical plane on the frame of the apparatus so that the latter may be set for radiator cores of various lengths.

The radiator core 4 shown in the drawings is of the fin and tube type, the tubes being indicated by 5, 5 and the fins by 6, 6. The fins are in the form of flat sheet metal plates, such as copper, and are of a size to extend from side to side and from front to rear of the core and have holes therein of a size to snugly fit about the tubes and through which the tubes extend, as in cores of this general type. The tubes 5 extend from the top to the bottom of the core and are there fitted with sheet metal head sheets 7, 7 to which are secured the sections (not shown) forming the top and bottom tanks of the completed core. These head sheets also have holes which snugly fit about the adjacent ends of the tubes and through which the tube ends extend so as to open into the respective upper and lower tanks to carry the water in streams from one tank to the other as in radiator design.

These tubes 5 are provided on the outside with a thin coating 8 of solder, as shown in Fig. 4. This coating is applied to each tube before it is assembled in the core, as by coating one side of the sheet metal at the time of making the tube in the tube mill. This coating is hard or set before the tubes and fins are assembled to form the core and the coating will not be scraped off when inserting the tubes through the holes in the fins 6. In making the holes in the fins slight ferrules 9 are struck out from one side of the fins about the holes therein so as to increase the amount of contact of the fins with the tubes. In forming these ferrules shallow pockets or recesses 10, 10 are formed about the tubes at the holes on the side of the fin opposite the ferrules, as shown in Figs. 4 and 5.

After the core 4 has been assembled with the coated tubes 5 inserted through the holes in the uncoated fins 6 and the head sheets 7, 7, the entire assembly is mounted on the transformer 1 with the head sheets clamped in the upper and lower clamps 2, 3, as shown in Figs. 1 and 2. This places the core 4 in the circuit afforded by the transformer and when the current is turned on (by suitable switch—not shown) a high amperage and low voltage current as produced by the transformer is sent through all of the tubes. The latter form a resistance in the circuit and, as soon as the tubes 5, 5 heat up to the fusing point of the solder coatings 8 thereon, the coatings melt and flow down over the tubes and collect about the same in the recesses 10 at the openings in the fins 6, as shown in Fig. 5. On turning off the current, the core cools and the molten solder quickly solidifies and secures the fins 6 and head sheets 7 securely in place on the tubes.

The amount of solder on the tubes is just sufficient to effectively secure the fins and head sheets to the tubes without any excess solder running over on the fins or head sheets beyond the tubes or remaining to excess on the portions of the tubes between the fins and the head sheets, as indicated in Fig. 5. This is important as the bare metal of the fins is left exposed to the external air so as to radiate heat thereto without hinderance of any excessive solder coating, as heretofore.

The radiator cores soldered by the method of my invention are free of excessive solder coatings and thus are more efficient as their heat transferring properties are not unduly impaired, as heretofore. Moreover, there is a saving of solder, as there is no excess solder carried by the core to increase its expense of production or weight.

By my method, the whole mass of the core is not heated. The heat is confined to the tubes and to such portions of the fin plates in the short area directly around the tubes. This is all that is required to fuse the solder to connect the fin plates to the tubes. The remaining portions of the fin plates act as radiating surfaces for the plates and thus keep the fin plates cool and prevent them from being heated to a temperature which would draw the temper from the plates. The advantage of this is that the plates may be made of a cheaper grade of copper as required for the oven baking process, and the copper will not lose its property to resist crushing and bending stress in the handling of the solder core in the further steps required in the manufacture of the complete radiator. In applying the current to the tubes through the headsheets which are usually of brass perfectly soldered connections are secured between the headsheets and the ends of the tubes inasmuch as the heat generated by passing the current through the headsheets does not oxidize the brass material to make imperfect connections as brought about with the oven baking method as heretofore employed. The gas heat of this method has an oxidizing effect on the brass of the headsheets, and makes it difficult to remove the oxide with the ordinary acids used in soldering operations. This condition is overcome in soldering by my method, and it is unnecessary after the core has been soldered to further treat it to perfect the connections between the headsheets and the tubes. Moreover, the headsheets permit the terminals of the transformer to be readily connected to the core, and also permit the current to be supplied to the multiplicity of tubes in the core through common conducting elements. With my method, the cost of the core is materially reduced, as compared with the core costs required for oven soldering, in that a cheaper grade of copper may be used for the fin plates, without removing the temper therefrom, which is not possible in the oven method, with the electrolytic copper for the fin plates. With a step-down transformer, the regular commercial current may be used for soldering the fin plates to the tubes. The regular commercial current is usually supplied at 220 volts, and with the step-down transformer, this commercial current can be reduced to approximately 2 volts at 1200 to 1500 amperes. Such current will heat the light sections of the tubes rapidly with a comparatively small current consumption, and thus make possible the soldering of the cores at a comparatively small production cost.

The details of the disclosure shown and described may be variously changed and modified without departing from the spirit and scope of my invention. Moreover, the invention is not limited to a multiplicity of tubes, but is equally as well applicable to a single tube with its fins.

I claim as my invention:

1. The method of soldering the fins and tubes of a radiator core together after being assembled with the tubes extending through openings in the fins, consisting in having the solder to be melted at the joints between the fins and the tubes, and then passing a suitable electric current through the tubes to heat the tubes and the adjacent edge portions only of the fins about and in contact with the tubes to the fusing point of the solder for soldering the fins to the tubes and allowing the remaining portions of the fins to be exposed for radiating the heat therefrom to maintain the fins relatively cool to prevent the loss of temper from the fins.

2. The method of soldering the fins and tubes of a radiator core together after being assembled with the tubes extending through openings in the fins, consisting in having the tubes carry an outside coating of the solder to be melted so as to provide solder for the joints between the tubes and the fins, and then passing a suitable electric current through the tubes to heat the tubes and the adjacent edge portions only of the fins about and in contact with the tubes to the fusing point of the solder for soldering the fins to the tubes, and allowing the remaining portions of the fins to be exposed for radiating the heat therefrom to maintain the fins relatively cool to prevent the loss of temper from the fins.

3. The method of soldering the fins and the head sheets of a radiator core to the tubes thereof after the core has been assembled with the tubes extending through openings in the fins and head sheets, respectively, consisting in having the solder to be melted at the joints between the head sheets and the fins with the tubes then passing a suitable electric current through the tubes from the head sheets to heat the tubes and the head sheets and the adjacent edge portions only of the fins about and in contact with the tubes to the fusing point of the solder for soldering the fins and the head sheets to the tubes and allowing the remaining portions of the fins to be exposed for radiating the heat from the fins to maintain the fins relatively cool to prevent the loss of temper from the fins.

4. The method of soldering the fins and tubes of a radiator core together after being assembled with the tubes extending through openings in the fins, consisting in having the solder to be melted at the joints between the fins and the tubes, and then connecting the tubes at the opposite ends of the core to the positive and negative terminals of an electric circuit and passing a current through the tubes to heat the tubes and the adjacent edge portions only of the fins about and in contact with the tubes to the fusing point of the solder for soldering the fins to the tubes and allowing the remaining portions of the fins to be exposed for radiating the heat therefrom to maintain the fins relatively cool to prevent the loss of temper from the fins.

5. The method of soldering the fins and tubes of a radiator core together after being assembled with the tubes extending through openings in the fins, consisting in having the solder to be melted at the joints between the fins and the tubes, and then sending an electric current of a high amperage and low voltage through the tubes to heat the tubes and the adjacent edge portions only of the fins about and in contact with the tubes to the fusing point of the solder for soldering the fins to the tubes, and allowing the remaining portions of the fins to be exposed for radiating the heat therefrom to maintain the fins relatively cool to prevent the loss of temper from the fins.

6. The method of soldering heat radiating fins to a tube after the tube and fins have been assembled with the tube extending through openings in the fins and the fins extending outward from the tube to provide extended heat radiating surfaces therefor, consisting in having the solder to be melted at the joints between the tube and the fins, and then passing an electric current through the tube to heat the tube and the adjacent edge portions only of the fins to the fusing point of the solder for soldering the fins to the tube, and allowing the fins to be exposed to radiate the heat therefrom to maintain the fins relatively cool to prevent the loss of temper from the fins.

In testimony whereof I affix my signature.

CHARLES WILLIAM OWSTON.